Oct. 9, 1962  F. SCHYTIL ET AL  3,057,680
METHOD OF CARRYING OUT HEAT-CONSUMING REACTIONS
Filed March 9, 1959
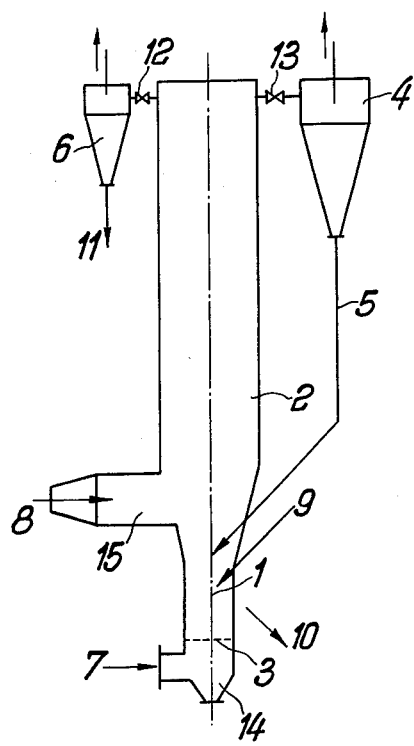
Inventors:
Franz Schytil
Lothar Reh
Pietro Saccardo
Paolo del Pozzo
By
Bailey, Stephens & Huettig
Attorneys United States Patent Office 3,057,680
Patented Oct. 9, 1962

3,057,680
METHOD OF CARRYING OUT HEAT-CONSUMING REACTIONS
Franz Schytil and Lothar Reh, Frankfurt am Main, Germany, and Pietro Saccardo and Paolo Dal Pozzo, Milan, Italy, assignors to Metallgesellschaft Aktiengesellschaft, Frankfurt am Main, Germany, and Sicedison S.p.A., Milan, Italy
Filed Mar. 9, 1959, Ser. No. 798,106
Claims priority, application Germany Mar. 11, 1958
7 Claims. (Cl. 23—88)

This invention relates to a method of and apparatus for carying out heat-consuming reactions between finely divided substances and gases at elevated temperatures.

It is already known to carry out heat-consuming chemical and physical reactions between solids and gases, such as drying and calcining, in a fluidised bed and to supply the necessary heat to the reaction by means of hot gases produced by a burner under the grate. The term "heat-consuming reactions" used herein is intended to denote both endothermic reactions as well as reactions which proceed without consuming heat or even with the generation of small quantities of heat, but which develop too little heat to balance the heat consumption occurring in the technical performance of the reaction so that in practice additional heat must be provided, although theoretically the thermal balance is positive.

It is also known that heat can be generated in a fluidised bed with a definite surface by the simultaneous performance therein of an exothermic reaction, for instance by the injection of oil into the bed. However, this latter step cannot be taken unless very high temperatures are desired or at least permissible within the bed. On the other hand, the introduction of heat by means of hot gases imposes great demands on the heat resistance of the grating and is a method which cannot be used if the gases are of a corrosive nature.

It is also known that a gas can be introduced laterally into a fluidised bed or into a cloud of suspended dust above the grate. It is further possible to introduce solids at a point above the grate as well as material recycled from the process that is being carried out. However, the gas introduced above the grate from the side of the reactor does not provide a substantial amount of sensible heat because such a gas is usually introduced at room temperature or at most is only slightly preheated.

The present invention aims at improving the aforedescribed procedures and at providing apparatus which permits pronounced high temperature reactions, that is to say reactions which proceed at temperatures in the neighbourhood of 500° C. or even substantially higher, as for example 1000° C. and more, to be performed by the fluidised solids technique in simple apparatus giving maximum throughputs, whilst maintaining a zone in which dilution of the reactant gas by hot gases injected for the purpose of heat supply can be avoided.

The invention essentially consists in carrying out heat-consuming reactions in a considerably expanded fluidised bed-like suspension maintained on a grate, the bed being expanded to such an extent that a well defined upper boundary of the fluidised bed will not develop, the degree of expansion being preferably 10 to 30 times that of initial of expansion (volume when fluidisation begins), and in introducing at least a substantial proportion of the necessary heat by the lateral introduction above the grate of hot gases at a temperature of at least 500° C. Such suspensions differ from classical stationary fluidised beds both by the absence of a well defined surface and by the slip velocity of the solids, i.e. the difference between their actual speed and the velocity of the gas being greater than the gravitational speed of fall, and from the well known pneumatic dust cloud techniques in that their solids density is very much higher (generally substantially exceeding 100 kg./cub. m., for example 150 kg./cub. m.) and that the concentration of the solids decreases in upward direction.

This suspension bed is maintained at a height of about 60 to 180 cms., preferably 100 cms., and above this level the cross section of the reactor is widened.

According to a feature of the invention, additional gas at high temperature, preferably above 500° C., is introduced where the wider portion begins, said gas being introduced in appropriate volumes to maintain gas velocities in the wider cross section which are at least as high as in the lower, narrower, section. The introduction above the grate of additional gas where the wider portion begins constitutes as much as 80% of the total gas used and permits any desired quantity of heat up to 100% to be supplied at any temperature level, and in the choice of desired reaction conditions this procedure is not subject to restrictions imposed by the heat resistance of the grate or the minimum combustion temperature of the fuel.

It will of course be readily understood that part of the necessary heat may also be provided by gases which are blown in from under the grating.

It is already known to inject additional gases above the grate which supports the fluidised bed. However, in this known process, the object is either to introduce a cold gas into a fluidised bed utilised for performing an exothermic chemical reaction in a non-expanded fluidised bed with a definite surface or to introduce combustion air or oxygen into an expanded fluidised bed without enlarging the cross section thereof, which bed is fluidised by a combustible gas, such as hydrogen or hydrogenation waste gas.

The method of the present invention is not comparable with the first mentioned type of process because it concerns heat-consuming reactions and not reactions which generate heat. Moreover, the application of an expanded slowly rising turbulent suspension permits substantial increases in throughput above that which is possible in conventional stationary fluidised beds with a well defined surface, the throughputs exceeding the maximum possible figures obtainable in stationary fluidised beds by as much as several 100%. Compared with the second aforementioned type of process, the method of the present invention has the advantage that the performance of the combustion outside the actual treating chambers permits temperature control to be far more accurate and overheating to be avoided with absolute certainty, a factor of importance in view of the particular sensitivity of an expanded fluidised bed to excessive heating and for chemical reactions with a narrow optimal temperature range.

Another advantage resides in the fact that the fluidising gas in the reaction chamber below the feed point of the hot gases is not diluted nor its chemical composition changed by these gases. Therefore reactions can be carried out in this zone of the reaction chamber which otherwise would be unfavourably influenced by the gaseous components of the combustion gases. Thus, for example, all possible danger of hydrolysis in this zone of the combustion chamber can be eliminated which could not reliably be prevented in the case of the known direct combustion of the fuel in the reaction chamber.

In many instances it may be advantageous to treat the solids with the gas in such a manner that every solid particle comes successively into contact with the gases of different concentration. It has been found that in the transformation of aluminum oxide or aluminum hydroxide into aluminum fluoride with gaseous hydrofluoric acid, a final product is obtained having a high $AlF_3$ content if a gaseous fluoric acid of low, preferably continuously decreasing concentration is allowed to act on the fine grained particles before they are subjected to the action of highly concentrated fluoric acid. In this manner aluminum fluoride with a standard strength above 90, for example 92% AlF₃ can be obtained, whereas in general only a standard strength of 85% is attainable by the processes hitherto known.

Finally, the procedure according to the invention also presents the advantage that much greater freedom in the selection of the chemical composition of the gases to be used is available than if the necessary heat has to be introduced by burning a combustible material or a gaseous component within the turbulent layer or the "entrained stream."

The method can therefore be used with particular advantage in all cases where accurate control of temperature and/or of the gas composition is required.

In the procedure according to the invention, the secondary gases from the dust chamber introduced at about the height of the widening, carry the dust particles upwards which are then separated from the gas current in known manner by dust separating devices, such as cyclones, and wholly or partly recycled. The recycling takes place at the point of the reactor where the conditions prevail which are most favourable for carrying out the reaction, which is generally at the height of the secondary gas feed and preferably slightly below this point, but at a certain height above the grating.

The recycled quantities can be introduced in cold or hot state. If they are hot they mix with the suspension bed and heat this in the process. The returned or recycled material can be introduced into the bed at such a high temperature that up to 100% of the heat requirement for the reaction is supplied by the sensible heat of the solids.

The secondary gas feed may be horizontal or inclined in upward or downward direction. If it is directed downwards better turbulence is produced in the lower zone.

The method according to the invention is particularly suitable for carrying out processes at particularly high temperatures, especially with fine grained substances having a particle size of less than 2 mms. and is hereinafter explained in greater detail with the aid of the accompanying drawing and several examples.

The means by which the objects of this invention are obtained are described more fully with reference to the accompanying drawing diagrammatically illustrating a vertical cross-sectional view through the apparatus, and as referred to in the following examples of the process.

*Example 1*

The problem envisaged in this application was the conversion of kieserite (MgSO₄·7H₂O), of a range of grain sizes of between 0.1 and 0.5 mm., into anhydrous magnesium sulphate. The kieserite charge was placed into the lower part 1 of the furnace at 9. From a supply pipe 7, flue gases at a temperature of 500° C., were introduced through a wind box 14 at an appropriate rate to produce a velocity above the grate of 1.3 meters/sec. This blast intensely fluidised the solids above the grate 3 which consisted of iron bars. Oil-combustion gases at a temperature of 1200° C. were admitted through a duct 8 in suitable volume to produce a gas velocity inside shaft 2 of 2.0 meters/sec. The ratio of the cross section of the narrower portion 1 to that of the wider portion 2 of the shaft was as 1:5.

The gases leaving the furnace were divided into two branch streams and the ratio of their volumes was regulated by appropriately adjusting the two valves 12 and 13. Part of the entrained dust was separated in a cyclone 6 and withdrawn at 11, the remainder being separated in a cyclone 4 and returned through duct 5. The quantity returned through duct 5 was suitably controlled for the maintenance of a continuous fluid layer in shaft 2 in which the solids density averaged 60 kg./cu. meter of carrier gas. The result was obtained in the prevailing conditions of the present example by returning at least 4.1 times the quantity of solids through duct 5 than was withdrawn through 11. The whole of the product was obtained at 11, and the secondary discharge provided at 10 was not used in the conditions hereinbefore described.

*Example 2*

In a similar manner aluminum hydroxide could be burned for the production of Al₂O₃ capable of being submitted to electrolysis.

In this case the thermal economy could still be further improved by introducing the crude hydroxide intermittently at 9 and drawing off also intermittently the calcined Al₂O₃ at 10 after the transformation temperature had been reached. The valve 12 was in this instance completely closed so that the entire production was obtained at 10.

Other reactions could be performed in a similar manner at elevated temperature, such as the calcination of lime and decomposition of iron sulphate. The production of metal halides, such as anhydrous aluminum chloride, also presented no difficulties because the halogen or a hydrohalic acid could be introduced cold through pipe 7.

*Example 3*

The method of the present invention is especially suited for fluoridising reactions requiring heat, for example for the production of aluminum fluoride from aluminum hydroxide or aluminum oxide and gaseous hydrofluoric acid, because the absence of water from combustion in the lower reaction zone prevents hydrolysis according to the reverse portion of the reaction equations

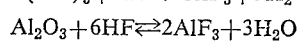

The reactor required for carrying out this process again corresponded substantially with that illustrated in the accompanying drawing. The cross section widening in the upper portion amounted in this instance to 1.8 times the cross-section of the grating. The apparatus was constructed of materials resistant to hydrofluoric acid attack (Monel metal and special graphite). The physical conditions mentioned at the outset which lead to the formatoin of a rising, turbulent suspension bed with the concentration of solids distribution decreasing in upward direction, were in this instance ensured by using a velocity in m./min. which amounted to at least 3000 times the square of the average particle diameter expressed in mm. With this object, 98 to 100% gaseous hydrofluoric acid was admitted at 7 at a temperature of 60° C., i.e. practically cold. The gas blast was controlled to produce a mass velocity of 1.0 ton HF/sq. meter grate area per hour. In addition, 700 standard cu. meters of inert gas per ton of bottom-blown HF gas were introduced at 8. The admission opening was 1.8 meters above the grate. Flue gas produced in the presence of excess air in the combustion chamber served quite well as inert gas. Either oil or, for instance, natural gas can be used as fuel. The admission opening 9 for the introduction of the solids was located 2.3 meters above the grate and 1.3 tons of dry aluminum hydroxide per sq. meter of grate area were discharged per hour. The particle size of the aluminum hydroxide was between 0.04 and 0.12 mm., the distribution maximum being 0.09 mm. A turbulent suspension of aluminum fluoride formed in the reactor, the density of which decreased in upward direction. The velocity of the gas was sufficient for discharging the material continuously overhead. The flue dust was collected in the hot cyclone 4 and returned in hot state to the turbulent layer below the lateral admission 8 for the heating gas.

The portoin of the turbulent suspensoin bed located below the admission opening for the heating gas, and also the bottom-blown hydrofluoric acid were heated by the returned hot material to temperatures of about 450 to 500° C. The reaction took place mainly in this zone very rapidly and with a good degree of efficiency because it was possible to work with practically 100% hydrofluoric acid undiluted by heating gas. The highly expanded state of the fluidised bed practically precluded downward immixture of gas so that from the gas side the reaction could be performed in something like countercurrent operation.

In the upper portion of the reactor the temperature rose to about 520 to 530° C. Some hydrofluoric acid was also reacted in this portion but the main process consisted in heating the aluminum fluoride which, after recycling, acted as heat carrier supplying the heat in the actual reaction zone. The reactor was 6 meters in height. The whole quantity of the product could be withdrawn at 10. It contained 94% $AlF_3$.

The waste gas leaving the cyclone 4 was practically free from dust and consisted of steam, inert gas and small quantities of hydrofluoric acid. The latter could for the most part be recovered by condensation in the form of an aqueous hydrofluoric acid. Minor traces still remaining could be washed out subsequently in a scrubber.

The grate construction is in itself not critical but it is advisable to provide a free grate area of at least 2% and preferably 3%.

*Example 4*

The method according to the invention is suited for the production of triployphosphate directly from a solution of the initial products, mono- and disodium phosphate. A reactor such as that illustrated in the drawing is again used but a mixing worm is introduced in the circuit following the recycling cyclone. The solution of the initial products with about 50% water content is injected into the mixing worm. The solids circulation is regulated to the liquid feed so that the material leaving the mixing worm contains 10% moisture and can be easily crumbled. The cross section ratio between the upper and lower portions of the reactor is chosen at 2:1. Flue gas is blown off below the grate at a temperature of 800° C. while the same quantity of flue gas enters the reactor from the upper combustion chamber at a temperature of 1200° C. Hot flue gas acting as carrier gas is used in such a quantity that a velocity of 5000 standard cu. meters/sq. meters/hr. prevails in the reactor. The temperature in the reactor should be around 400° C. At this temperature the water of the solution evaporates and tripolyphosphate forms. The yield is slightly granular and can be graded on a screening machine. Over- and under-sized grains from this grading are returned to the mixing worm by mechanical or pneumatic conveying means. About 5000 standard cubic meters of carrier gas are used per ton of finished tripolyphosphate.

A special and very unexpected advantage of the method according to the invention is that the charging velocity in all processes can be many times higher than the permissible speed in a conventional stationary fluidised bed.

For very large throughputs exceptionally large cross sections may be used, for example, furnaces 6 to 8 meters in diameter, owing to the fact that the inlets 9 and return ducts 5 are uniformly distributed around the periphery.

In all apparatus of industrial size, i.e. independently of whether only one or several charging and return ducts are used, a kind of injector effect is produced in such a manner that the concentration of solids is non-uniformly distributed in every horizontal cross section.

This is however by no means a drawback, especially if the duct leading to the cyclone 6 is located at a point of lower solids concentration and does not tap the primary stream, in which case a particularly well reacted product is obtained which has been exposed to the reaction conditions for a considerable time.

We claim:

1. A process for performing heat-consuming reactions between solids and chemically reactive gases to change the chemical composition of the solid, comprising forming a slowly rising turbulent suspension of solids in a reactor having a bottom grate, a lower narrow shaft portion above said grate and an upper wider shaft portion above said narrow portion, by passing lifting gas upwardly through said grate at a velocity to suspend and move continuously upwardly solids in said shaft portions with the suspension of solids decreasing in density from said grate to the top of said wider shaft portion and without the formation of a definite upper level surface of solids suspension, said lifting gas being at least the major portion of the chemically reactive gas and undiluted while in contact with said solids in said lower shaft portion, continuously removing gas and all of the solids from the top of said wider shaft portion, separating a part of the removed solids from the gas and recycling the separated solids to said lower shaft portion in such quantity as to maintain said upwardly decreasing solids suspension, and introducing hot gases having a temperature of at least 500° C. into said suspension of solids at a point above the entry of said recycled separated solids into said lower portion and at about the juncture of said lower narrow shaft portion and said upper wider shaft portion for supplying at least a part of the heat required for the reaction between the solids and gases.

2. A process as in claim 1, said hot gases comprising about 80 percent of the total quantity of gas in said reactor.

3. A process as in claim 1, said hot gases supplying about 100 percent of the heat required for the reaction between said solids and said gases.

4. A process as in claim 1, said lifting gas comprising a reacting gas for reaction with said solids in said lower narrow shaft portion, and said hot gases being inert gases.

5. A process as in claim 1, said recycled solids being introduced into said lower narrow shaft portion at a temperature which supplies up to 100 percent of the heat required for the reaction of the solids.

6. A process as in claim 1, said heat-consuming reaction between the solids and gases comprising a halogenation of the solids by the action of the gases introduced through the grate, said gases containing substances selected from the group consisting of $X_2$ and HX, wherein X is a halogen.

7. A process as in claim 1, said solids being selected from the class consisting of aluminum oxide and aluminum hydroxide, and said lifting gas comprising gaseous hydrofluoric acid for reacting with said solids to produce aluminum fluoride.

References Cited in the file of this patent

UNITED STATES PATENTS

| | | |
|---|---|---|
| 1,937,885 | Gitzen et al. | Dec. 5, 1933 |
| 2,325,136 | Kassel | July 27, 1943 |
| 2,493,498 | Peery | Jan. 3, 1950 |
| 2,580,635 | Winter | Jan. 1, 1952 |
| 2,621,118 | Cyr et al. | Dec. 9, 1952 |
| 2,650,084 | White | Aug. 25, 1953 |
| 2,701,758 | Danulet et al. | Feb. 8, 1955 |
| 2,732,283 | Clukey | Jan. 24, 1956 |
| 2,733,137 | Swaine et al. | Jan. 31, 1956 |
| 2,741,549 | Russell | Apr. 10, 1956 |
| 2,799,640 | Pevere et al. | July 16, 1957 |